(12) United States Patent
Zhang et al.

(10) Patent No.: US 9,282,497 B2
(45) Date of Patent: Mar. 8, 2016

(54) INTER-RADIO ACCESS TECHNOLOGY TRANSITION BASED ON QUALITY OF SERVICE EVALUATION

(71) Applicant: Apple Inc., Cupertino, CA (US)

(72) Inventors: Ying Zhang, Beijing (CN); Qiang Miao, Beijing (CN); Yaoqi Yan, Beijing (CN)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 13/857,119

(22) Filed: Apr. 4, 2013

(65) Prior Publication Data

US 2014/0301214 A1    Oct. 9, 2014

(51) Int. Cl.
| | |
|---|---|
| H04W 36/26 | (2009.01) |
| H04W 36/18 | (2009.01) |
| H04W 36/00 | (2009.01) |
| H04W 36/14 | (2009.01) |

(52) U.S. Cl.
CPC .............. *H04W 36/26* (2013.01); *H04W 36/18* (2013.01); *H04W 36/0011* (2013.01); *H04W 36/14* (2013.01)

(58) Field of Classification Search
None
See application file for complete search history.

(56) References Cited

U.S. PATENT DOCUMENTS

| | | | |
|---|---|---|---|
| 8,200,239 B2 | 6/2012 | Mia et al. | |
| 2008/0014941 A1* | 1/2008 | Catovic | H04W 36/30 455/436 |
| 2009/0088159 A1* | 4/2009 | Wu | H04W 36/14 455/436 |
| 2010/0046369 A1 | 2/2010 | Zhao et al. | |
| 2012/0057567 A1* | 3/2012 | Kruglick | H04W 36/16 370/331 |
| 2012/0177002 A1 | 7/2012 | Faucher et al. | |
| 2012/0184277 A1* | 7/2012 | Hiltunen | H04W 36/30 455/437 |
| 2014/0011502 A1* | 1/2014 | Moilanen | H04W 36/0061 455/437 |
| 2014/0113630 A1* | 4/2014 | Vangala | H04W 36/26 455/436 |

FOREIGN PATENT DOCUMENTS

| | | | |
|---|---|---|---|
| WO | 2005064971 A1 | 7/2005 | |
| WO | 2006071178 A1 | 7/2006 | |

* cited by examiner

*Primary Examiner* — Andrew Lai
*Assistant Examiner* — Jamaal Henson
(74) *Attorney, Agent, or Firm* — Downey Brand LLP

(57) ABSTRACT

A method for determining whether to allow performance of an inter-radio access technology (IRAT) transition is provided. The method can include a wireless communication device determining a realized quality of service (QoS) for packet switched data traffic on a first radio access technology (RAT); determining whether the realized QoS satisfies a threshold QoS; suspending IRAT transition to a second RAT in an instance in which it is determined that the realized QoS satisfies the threshold QoS; and allowing IRAT transition to the second RAT in an instance in which it is determined that the realized QoS does not satisfy the threshold QoS.

25 Claims, 9 Drawing Sheets

US 9,282,497 B2

INTER-RADIO ACCESS TECHNOLOGY TRANSITION BASED ON QUALITY OF SERVICE EVALUATION

FIELD OF THE DESCRIBED EMBODIMENTS

The described embodiments relate generally to wireless communications and more particularly to making an inter-radio access technology (IRAT) transition decision based on quality of service (QoS) evaluation.

BACKGROUND

Modern wireless communication devices often operate in mixed radio access technology (RAT) environments in which multiple RATs are deployed with overlapping coverage areas. For example, Long Term Evolution (LTE) networks can be deployed in overlapping regions with second generation (2G) and third generation (3G) RATs, including Universal Mobile Telecommunications System (UMTS) networks and Global System for Mobile Communications (GSM) networks. As such, a wireless communication device supporting operation over multiple RATs can select a RAT to use for network access, and can transition between RATs as the device moves between coverage areas through an IRAT transition procedure.

In current IRAT decision making for performance of a reselection or handover, only signal strength is considered. As such, there are situations in which IRAT transition can be triggered when a user can still get a good experience for active data traffic in the serving RAT even though the signal strength of the serving RAT may be below a threshold for triggering an IRAT reselection or handover. IRAT activities result in significant traffic discontinuity due to cell selection procedures and signaling exchanges, such as location update (LU) and routing area update (RAU), that are performed attendant to transitioning from a serving RAT to a target RAT. As such, user experience during an IRAT transition procedure can suffer, as data traffic discontinuity can interrupt and delay user activities.

Moreover, just because a target RAT has better coverage than a serving RAT does not mean that the target RAT will support a sufficient QoS. For example, a 2G RAT cell can have a broader coverage area than a 3G or LTE RAT cell, and thus may generally have the best signal strength of available RATs. However, a 2G RAT may not offer a better QoS than 3G or LTE, even if the signal strength of the 2G RAT is stronger than a serving RAT.

SUMMARY OF THE DESCRIBED EMBODIMENTS

Some example embodiments disclosed herein provide for making an inter-radio access technology (IRAT) transition decision based on quality of service (QoS) evaluation. In this regard, a wireless communication device in accordance with some example embodiments can be configured, to determine whether a realized QoS for data traffic on a serving RAT satisfies a threshold QoS. In the event that the realized QoS satisfies the threshold QoS, the device can suspend IRAT transition to a target RAT. As such, traffic discontinuities that can be suffered during IRAT transition procedures can be avoided in an instance in which a user can still get a good experience for active data traffic in the serving RAT even though the signal strength of the serving RAT may be below a threshold for triggering an IRAT transition to the target RAT.

In a first embodiment, a method for determining whether to allow performance of an IRAT transition is provided. The method of the first embodiment can include a wireless communication device determining a realized QoS for packet switched data traffic on a first RAT; determining whether the realized QoS satisfies a threshold QoS; suspending IRAT transition to a second RAT in an instance in which it is determined that the realized QoS satisfies the threshold QoS; and allowing IRAT transition to the second RAT in an instance in which it is determined that the realized QoS does not satisfy the threshold QoS.

In a second embodiment, a wireless communication device is provided. The wireless communication device of the second embodiment can include at least one transceiver and processing circuitry coupled to the at least one transceiver. The at least one transceiver can be configured to transmit data and receive data using a first RAT and a second RAT. The processing circuitry can be configured to control the wireless communication device to at least determine a realized QoS for packet switched data traffic on a first RAT; determine whether the realized QoS satisfies a threshold QoS; suspend IRAT transition to the second RAT in an instance in which it is determined that the realized QoS satisfies the threshold QoS; and allow IRAT transition to the second RAT in an instance in which it is determined that the realized QoS does not satisfy the threshold QoS.

In a third embodiment, a computer program for determining whether to allow performance of an IRAT transition is provided. The computer program product of the third embodiment can include at least one non-transitory computer readable storage medium having program code stored thereon. The program code can include program code for determining a realized QoS for packet switched data traffic on a first RAT; program code for determining whether the realized QoS satisfies a threshold QoS; program code for suspending IRAT transition to a second RAT in an instance in which it is determined that the realized QoS satisfies the threshold QoS; and program code for allowing IRAT transition to the second RAT in an instance in which it is determined that the realized QoS does not satisfy the threshold QoS.

In a fourth embodiment, an apparatus for determining whether to allow performance of an IRAT transition is provided. The apparatus of the fourth embodiment can include means for determining a realized QoS for packet switched data traffic on a first RAT; means for determining whether the realized QoS satisfies a threshold QoS; means for suspending IRAT transition to a second RAT in an instance in which it is determined that the realized QoS satisfies the threshold QoS; and means for allowing IRAT transition to the second RAT in an instance in which it is determined that the realized QoS does not satisfy the threshold QoS.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present specification are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments disclosed herein provide for making an inter-radio access technology (IRAT) transition decision based on quality of service (QoS) evaluation. In this regard, the wireless communication device of some example embodiments can be configured to factor in realized QoS in addition to measured RF parameters, such as measured signal strength when making an IRAT transition decision. For example, a wireless communication device in accordance with some example embodiments can be configured to determine whether a realized QoS for data traffic on a serving RAT satisfies a threshold QoS. In the event that the realized QoS satisfies the threshold QoS, the wireless communication device of such example embodiments can suspend IRAT transition to a target RAT. As such, traffic discontinuities that can be suffered during IRAT transition procedures can be avoided in an instance in which a user can still get a good experience for active data traffic in the serving RAT even though the signal strength of the serving RAT may be below a threshold for triggering an IRAT transition to the target RAT.

Figure 1:
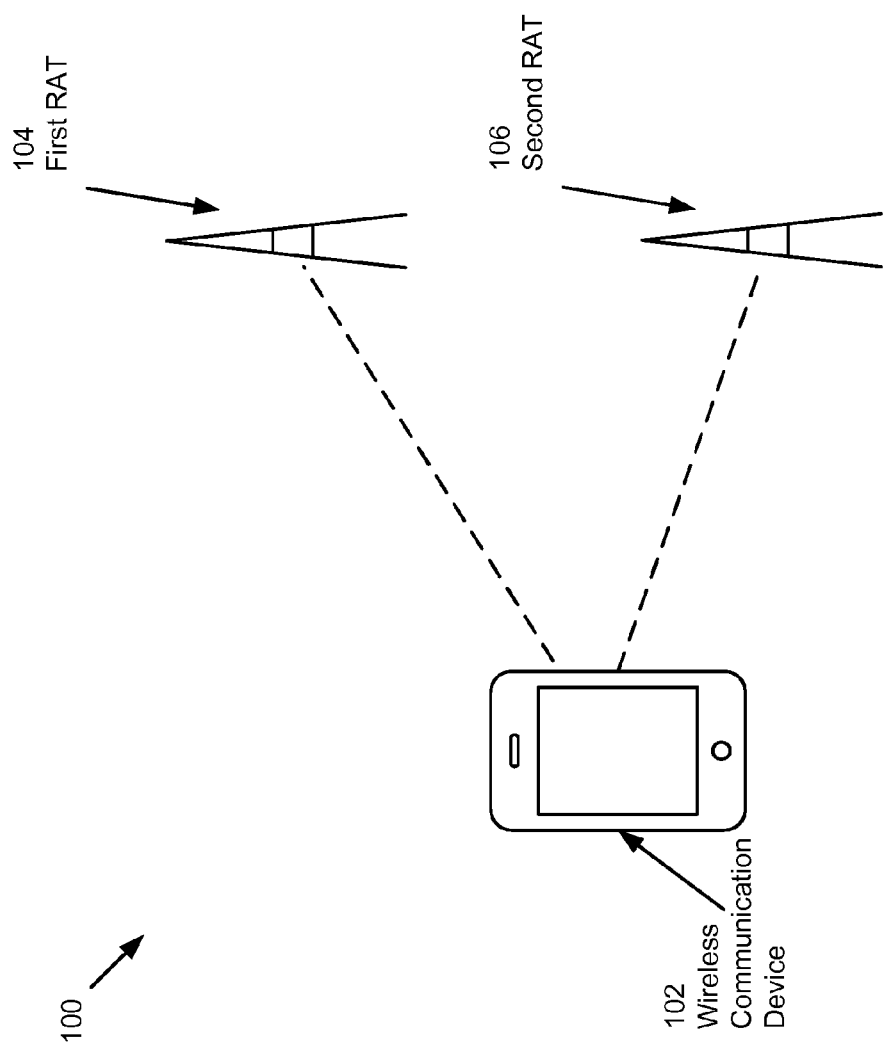
FIG. 1 illustrates an example system including multiple RATs to which a wireless communication device can connect in accordance with some example embodiments.

FIG. 1 illustrates an example system 100 including multiple RATs to which a wireless communication device 102 can connect in accordance with some example embodiments. By way of non-limiting example, the wireless communication device 102 can be a cellular phone, such as a smart phone device; a tablet computing device; a laptop computing device; or other computing device configured to operate within a plurality of RATs, including both a first RAT 104 and a second RAT 206.

As illustrated in FIG. 1, the wireless communication device 102 can be within signaling range of both a base station or other access point for the first RAT 104 and a base station or other access point for the second RAT 206. In this regard, the wireless communication device 102 can be located in a region of overlapping coverage of the first RAT 104 and the second RAT 206. It will be appreciated, however, that the system 100 can include one or more further RATs in addition to the first RAT 104 and second RAT 106, such that the wireless communication device 102 can, in some instances, be within an area of overlapping coverage of three or more RATs.

The first RAT 104 can be a serving RAT for the wireless communication device 102. In this regard, the wireless communication device 102 can be connected to the first RAT 104, and can be engaged in a data session, such as a packet switched data session, over the first RAT 104. The second RAT 106 can be a target RAT to which the wireless communication device 102 can transition through an IRAT transition procedure, such as a handover or reselection, from the first RAT 104.

The first RAT 104 and second RAT 106 can each implement any respective RAT. However, the RAT implemented by the second RAT 106 can be different form the RAT implemented by the first RAT 104. In some example embodiments, one or both of the first RAT 104 and second RAT 106 can implement a cellular RAT. By way of example, in embodiments in which one or both of the first RAT 104 and second RAT 106 can implement a cellular RAT, the cellular RAT(s) can include a fourth generation (4G) RAT, such as a an LTE RAT (e.g., LTE, LTE Advanced, or the like); a 3G RAT, such as a Universal Mobile Telecommunications System (UMTS) RAT (e.g., a Wideband Code Division Multiple Access (WCDMA), a Time Division Synchronous Code Division Multiple Access (TD-SCDMA) network, and/or other UMTS RAT), a CDMA2000 RAT (1×RTT), and/or other 3G RAT; a 2G RAT, such as a Global System for Mobile Communications (GSM) RAT; and/or other presently existing or future developed cellular RAT.

Figure 2:
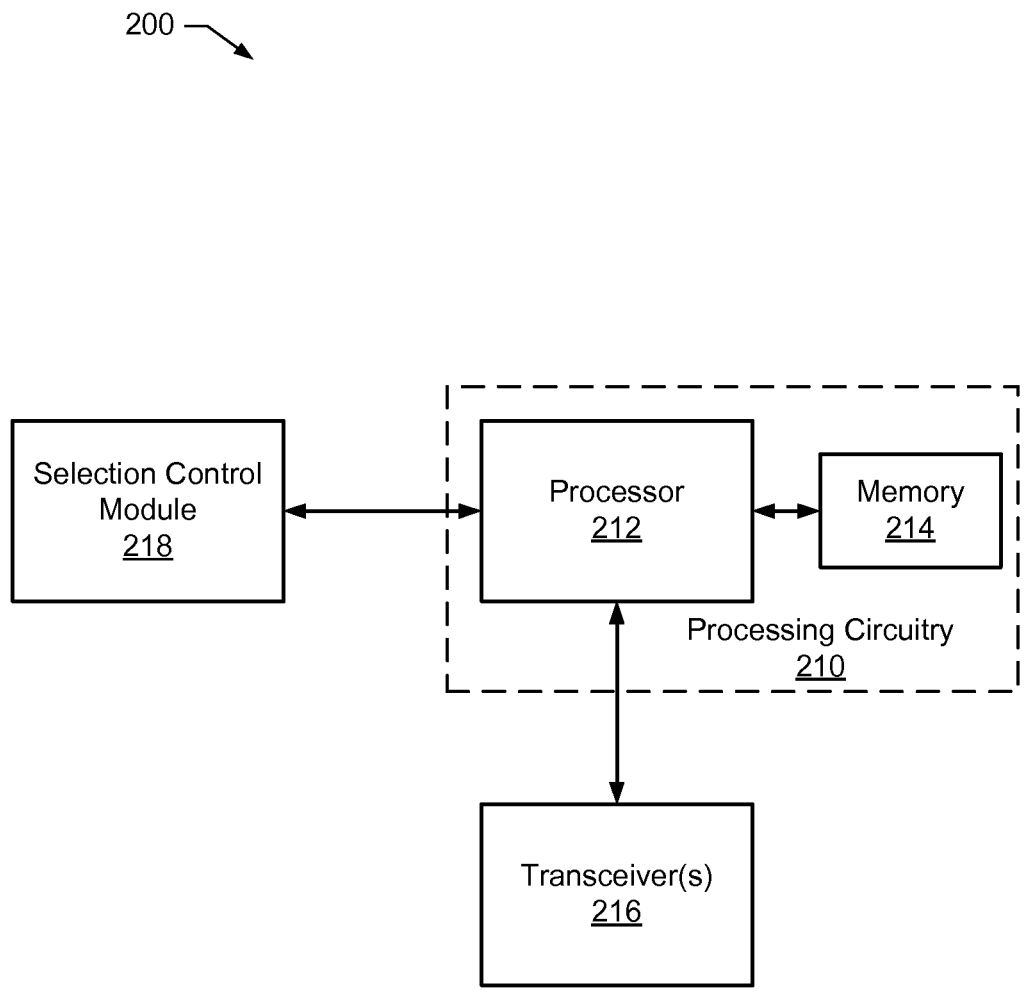
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 and, by extension, means for performing functionalities of the wireless communication device 102 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset(s). In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to enable a computing device to operate over the first RAT 104 and/or the second RAT 106. In this regard, one or more components of the apparatus 200 can, for example, provide a cellular baseband chipset, which can enable a computing device to operate over the first RAT 104 and/or the second RAT 106.

In some example embodiments, the processing circuitry 210 can include a processor 212 and, in some embodiments, such as that illustrated in FIG. 2, can further include memory 214. The processing circuitry 210 can be in communication with or otherwise control a transceiver(s) 216 and/or selection control module 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 can be capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver(s) 216, or selection control module 218 via a bus(es) for passing information among components of the apparatus 200.

The apparatus 200 can further include transceiver(s) 216. The transceiver(s) 216 can enable the apparatus 200 to send wireless signals to and receive signals from one or more wireless networks, such as the first RAT 104 and the second RAT 206. As such, the transceiver(s) 216 can be configured to support any type of cellular or other wireless communication technology that may be implemented by a RAT that can be deployed within the system 100, including the first RAT 104 and/or second RAT 206. In some example embodiments, the transceiver(s) 216 can include a single transceiver configured to enable the wireless communication device 102 to connect to both the first RAT 104 and the second RAT 206. Alternatively, in some example embodiments, the transceiver(s) 216 can include a first transceiver configured to enable the wireless communication device 102 to connect to the first RAT 104 and a second transceiver configured to enable the wireless communication device 102 to connect to the second RAT 206.

The apparatus 200 can further include selection control module 218. The selection control module 218 can be embodied as various means, such as circuitry, hardware, a computer program product comprising a computer readable medium (for example, the memory 214) storing computer readable program instructions executable by a processing device (for example, the processor 212), or some combination thereof. In some embodiments, the processor 212 (or the processing circuitry 210) can include, or otherwise control the selection control module 218. As will be described further herein below, the selection control module 218 can be configured to make determinations as to whether to suspend or allow IRAT transition to a target RAT, such as the second RAT 206, based at least in part on a QoS realized on a serving RAT, such as the first RAT 104.

Figure 3:
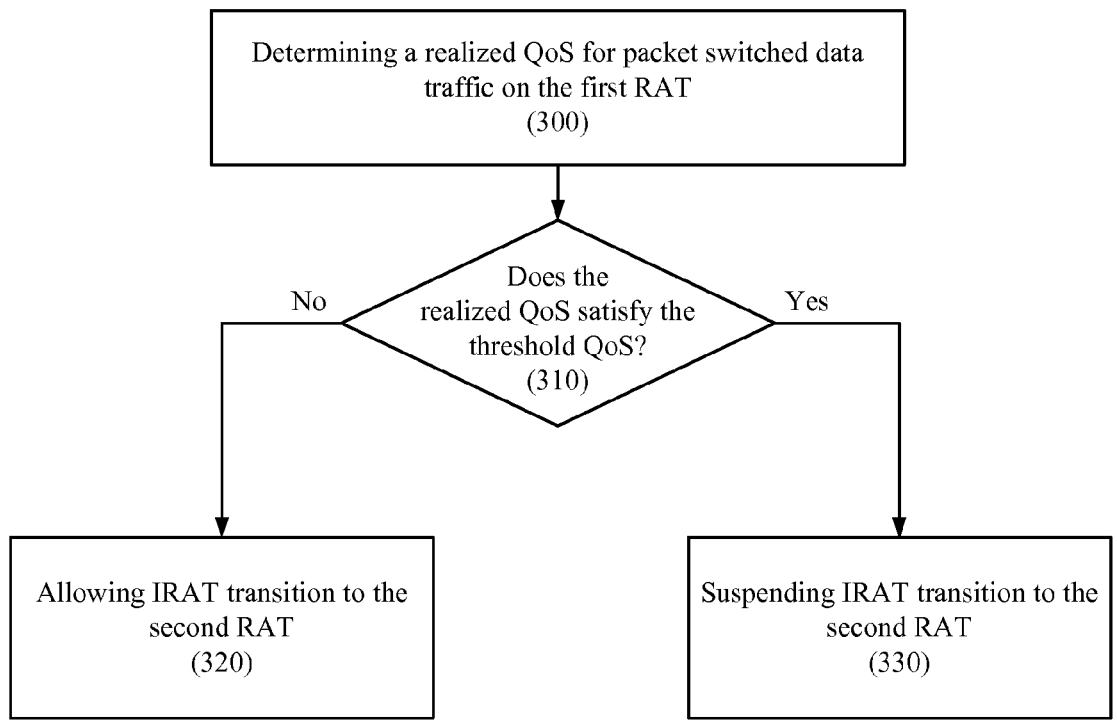
FIG. 3 illustrates a flowchart according to an example method for determining whether to allow performance of an IRAT transition according to some example embodiments.

FIG. 3 illustrates a flowchart according to an example method for determining whether to allow performance of an IRAT transition according to some example embodiments. In this regard, FIG. 3 illustrates operations that can be performed by the wireless communication device 102 in accordance with some example embodiments. One or more of processing circuitry 210, processor 212, memory 214, transceiver(s) 216, or selection control module 218 can, for example, provide means for performing the operations illustrated in and described with respect to FIG. 3.

Operation 300 can include the wireless communication device 102 determining a realized QoS for packet switched data traffic on the first RAT 104. The realized QoS can include one or more QoS metrics that can be measured or otherwise observed by the wireless communication device 102. By way of non-limiting example, the realized QoS can be measured and/or otherwise defined in terms of a realized jitter, realized transfer delay, realized bit rate, realized bit error rate, some combination thereof, or the like for packet switched data traffic that can be transmitted (e.g., uplink data traffic) and/or received (e.g., downlink data traffic) by the wireless communication device 102 on the first RAT 104. As a further example, the realized QoS can be defined at least in part in terms of one or more of an observed depth of a transmission queue and/or a realized throughput (e.g., an uplink and/or downlink bit rate).

As will be described further herein below, such as with respect to FIGS. 7 and 8, the realized QoS can, for example, be determined at the application layer, such as by an application engaged in an active data session, and/or at the baseband layer. For example, the application layer can determine a realized QoS based at least in part on end-to-end communication metrics, such as jitter, transfer delay, bit rate, bit error rate, and/or the like, for a data session. Additionally or alternatively, the baseband layer can monitor physical layer traffic to determine metrics, such as a transmission queue depth, throughput, and/or other QoS metrics that can be measured or otherwise observed at the baseband layer.

Operation 310 can include the wireless communication device 102 determining whether the realized QoS satisfies a threshold QoS. The threshold QoS can, for example, be defined as a minimum QoS that can provide an acceptable level of user experience. As another example, the threshold QoS can be defined as a minimum QoS that can support a type of data traffic, functionality of an active application, and/or the like without resulting in dropped sessions, an unacceptable bit error rate, and/or otherwise unacceptably impacting end user experience and/or application or device functionality.

It will be appreciated that in some example embodiments, multiple realized QoS metrics can be determined, and can be compared to respective corresponding thresholds. In this regard, operation 310 can include determining whether multiple thresholds are satisfied. In some example embodiments in which multiple realized QoS metrics are compared to respective corresponding thresholds, each of the thresholds may have to be satisfied in order for the wireless communication device 102 to determine that the threshold QoS is satisfied by the realized QoS. As another example, in some example embodiments in which multiple realized QoS metrics are compared to respective corresponding thresholds, at least a certain number of the thresholds may have to be satisfied in order for the wireless communication device 102 to determine that the threshold QoS is satisfied by the realized QoS.

As a non-limiting example, operation 310 can include determining whether a transmission queue depth is less than a threshold depth and whether an uplink/downlink (UL/DL) bit rate is greater than a threshold bit rate. For example, in some example embodiments, the determination of whether the realized QoS satisfies the threshold QoS can be logically defined as:

Realized QoS satisfies Threshold QoS If: Queue depth<Threshold (D) (If Conversational/Streaming class available) && UL/DL bit rate>Threshold(R)

In an instance in which it is determined at operation 310 that the threshold QoS is not satisfied by the realized QoS, the method can proceed to operation 320, which can include the wireless communication device 102 allowing IRAT transition to the second RAT 106. For example, in some example embodiments, the wireless communication device 102 can reselect to the second RAT 106 at operation 320. As another example, in some example embodiments, operation 320 can include sending a measurement report to a serving base station on the first RAT 104 to trigger handover to the second RAT 106. For example, the measurement report can include a radio frequency (RF) measurement value, such as a reference signal received power (RSRP), reference signal received quality (RSRQ), received signal strength indicator (RSSI), received signal code power (RSCP), and/or the like that can be indicative of a signal quality for the first RAT 104 and/or for the second RAT 106 to trigger handover to the second RAT 106.

If, however, it is determined at operation 310 that the threshold QoS is satisfied by the realized QoS, the method can instead proceed to operation 330, which can include the wireless communication device 102 suspending IRAT transition to the second RAT 106. For example, operation 330 can include suspending IRAT activities, such as suspending IRAT measurement reporting for triggering IRAT transition to the second RAT 106. In this regard, IRAT transition can be suspended in operation 330 even if an RF measurement value for the first RAT 104 and/or second RAT 106 meets a threshold for reselection and/or handover to the second RAT 106. If, however, at some point after performance of operation 330, the realized QoS ceases to satisfy the threshold QoS, however, the wireless communication device 102 can cease suspension of IRAT activities and can initiate or otherwise trigger an IRAT transition from the first RAT 104 to an available target RAT, such as the second RAT 106.

Figure 4:
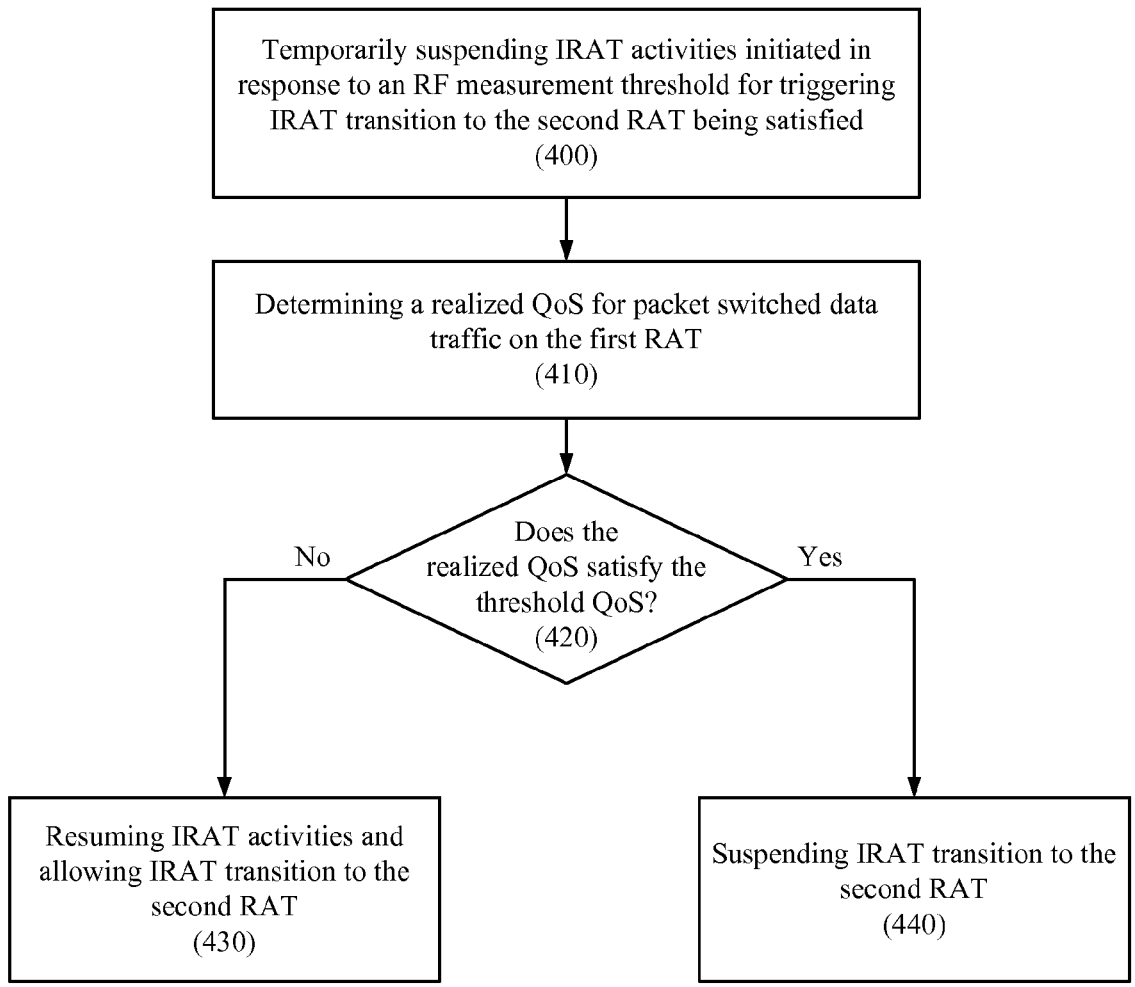
FIG. 4 illustrates a flowchart according to another example method for determining whether to allow performance of an IRAT transition according to some example embodiments.

In some example embodiments, the comparison of a realized QoS to a threshold QoS, such as in operation 310 can be performed after IRAT activities have been initiated in response to an RF measurement value meeting a threshold for triggering an IRAT transition to the second RAT 106. FIG. 4 illustrates a flowchart according to an example method for determining whether to allow performance of an IRAT transition after a measured RF parameter has triggered initiation of IRAT activities for transitioning to the second RAT 106 according to some such example embodiments. In this regard, FIG. 4 illustrates operations that can be performed by the wireless communication device 102 in accordance with some example embodiments. One or more of processing circuitry 210, processor 212, memory 214, transceiver(s) 216, or selection control module 218 can, for example, provide means for performing the operations illustrated in and described with respect to FIG. 4.

Operation 400 can include the wireless communication device 102 temporarily suspending IRAT activities initiated in response to an RF measurement threshold for triggering IRAT transition to the second RAT 106 being satisfied. For example, a measured RSRP, RSRQ, RSSI, RSCP, and/or the like for the first RAT 104 and/or second RAT 106 may have satisfied a threshold for initiating an IRAT transition procedure for transitioning to the second RAT 106, such as by sending a measurement report to a serving base station for triggering an IRAT transition. As such, by way of non-limiting example, operation 400 can include temporarily suspending IRAT measurement reporting.

Operation 410 can include the wireless communication device 102 determining a realized QoS for packet switched data traffic on the first RAT 104. In this regard, operation 410 can correspond to operation 300 as illustrated in and described with respect to FIG. 3. Operation 420 can, in turn, include the wireless communication device 102 determining whether the realized QoS satisfies a threshold QoS. In this regard, operation 420 can correspond to operation 310 as illustrated in and described with respect to FIG. 3.

In an instance in which it is determined in operation 410 that the realized QoS does not satisfy the threshold QoS, the method can proceed to operation 430, which can include the wireless communication device 102 resuming IRAT activities and allowing IRAT transition to the second RAT 106. For example, operation 430 can include the wireless communication device 102 resuming any IRAT measurement reporting that may have been suspended in operation 410. Thus, for example, if an RF measurement parameter has satisfied a threshold for initiating an IRAT transition procedure, such as if a measured signal strength for the first RAT 104 is below a threshold level, the wireless communication device 102 can send a measurement report to a serving base station to trigger an IRAT transition to the second RAT 106.

If, however, it is determined in operation 410 that the realized QoS does satisfy the threshold QoS, the method can instead proceed to operation 440, which can include the wireless communication device 102 suspending IRAT transition to the second RAT 106. As such, the wireless communication device 102 can remain on the first RAT 104 attendant to performance of operation 440 in spite of the RF measurement threshold for triggering an IRAT transition being satisfied, as the realized QoS can be acceptable on the first RAT 104.

In some example embodiments, a decision of whether to allow performance of an IRAT transition can be based on a prioritization of a serving RAT versus a target RAT. In this regard, the wireless communication device 102 of some example embodiments can prioritize a plurality of RATs based at least in part on a QoS (e.g., a theoretical QoS) that can be supported by the respective RATs. For example, LTE/4G can offer a higher QoS for packet switched data traffic than UMTS/3G, which can, in turn, offer a higher QoS for packet switched data traffic than GSM/2G. Thus, by way of non-limiting example, the wireless communication device 102 can define a RAT priority as: LTE/4G>UMTS/3G>GSM/2G. In some such example embodiments, the selection control module 218 can be configured to suspend IRAT activities for a lower priority RAT if the realized QoS on a serving RAT satisfies a threshold QoS. However, in some such example embodiments, the selection control module 218 can allow IRAT activities for a higher priority RAT, which may offer a higher QoS than the serving RAT. Thus, for example, if the wireless communication device 102 is on UMTS and the threshold QoS is satisfied by the realized QoS, the selection control module 218 of some example embodiments can be configured to suspend IRAT activities for GSM, but may attempt IRAT transition to LTE. If, however, the threshold QoS is not satisfied by the realized QoS in UMTS, the selection control module 218 of some such example embodiments can try to reselect to an available RAT having the highest priority that can meet the threshold QoS. In this regard, knowledge of RAT priority can be used to avoid IRAT activities on a non-preferred RAT and reduce the possibility of transitioning to a worse RAT that may provide a lower QoS and a worse user experience.

Figure 5:
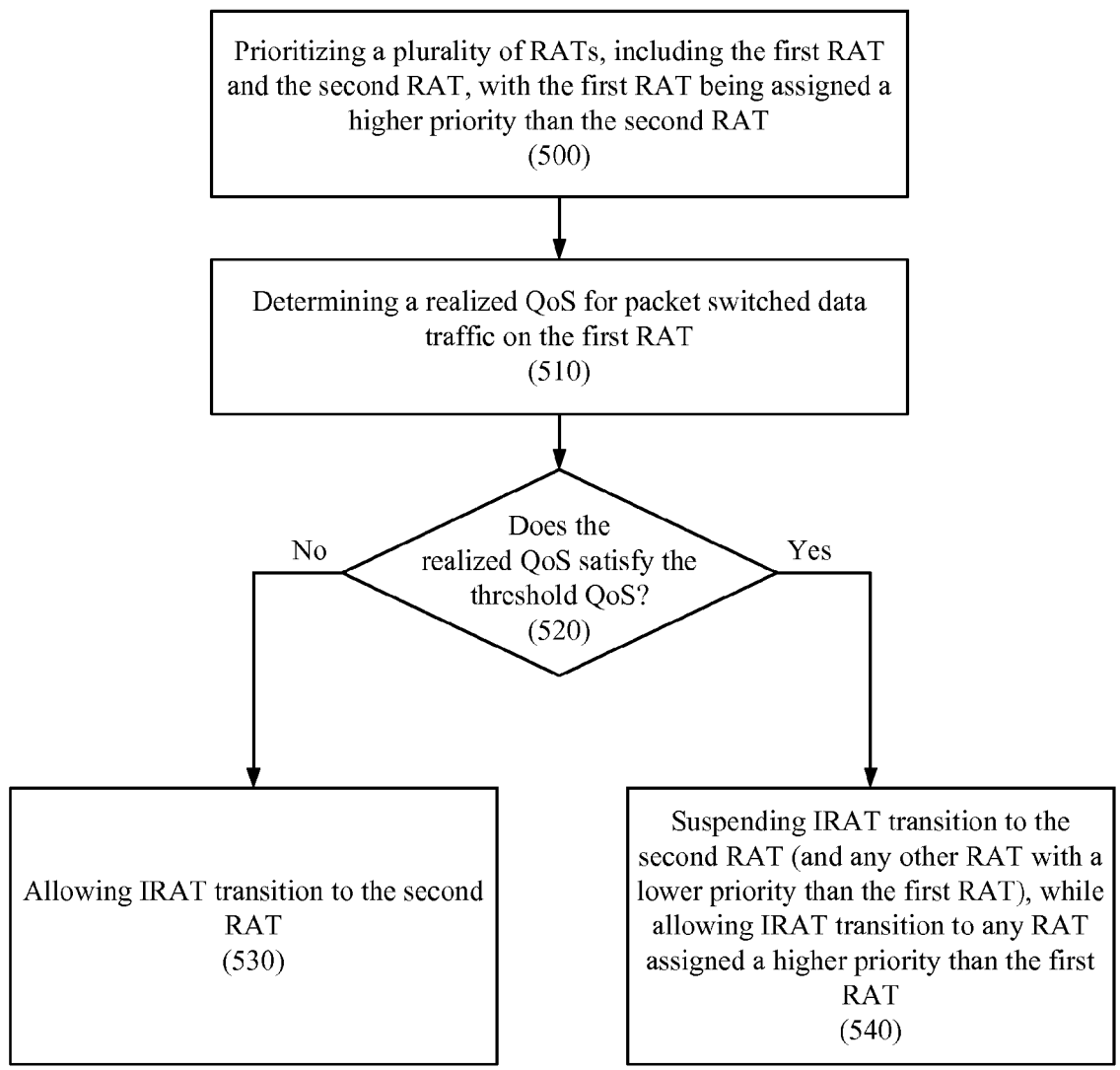
FIG. 5 illustrates a flowchart according to a further example method for determining whether to allow performance of an IRAT transition according to some example embodiments.

FIG. 5 illustrates a flowchart according to an example method for determining whether to allow performance of an IRAT transition according to some example embodiments in which RAT priority can be factored in IRAT decision making by the wireless communication device 102. One or more of processing circuitry 210, processor 212, memory 214, transceiver(s) 216, or selection control module 218 can, for example, provide means for performing the operations illustrated in and described with respect to FIG. 5.

Operation 500 can include the wireless communication device 102 prioritizing a plurality of RATs. The plurality of RATs can include the first RAT 104 and second RAT 106. It will be appreciated, however, that the plurality of RATs can include one or more further RATs that may be available within the system 100. In the example of FIG. 5, the first RAT 104 can be assigned a higher priority than the second RAT 106.

Operation 510 can include the wireless communication device 102 determining a realized QoS for packet switched data traffic on the first RAT 104. In this regard, operation 510 can correspond to operation 300 and/or operation 410 as previously described. Operation 520 can include the wireless communication device 102 determining whether the realized QoS satisfies the threshold QoS. In this regard, operation 520 can correspond to operation 310 and/or operation 420 as previously described.

In an instance in which it is determined at operation 520 that the realized QoS does not satisfy the threshold QoS, the method can proceed to operation 530, which can include allowing IRAT transition to the second RAT 106. In some such example embodiments, however, if there is an available RAT with a higher priority than the second RAT 106, the wireless communication device 102 can first attempt to transition to the higher priority RAT before transitioning to the second RAT 106. For example, assuming an example prioritization of LTE>UMTS>GSM, if the first RAT 104 is UMTS and the second RAT 106 is GSM and an LTE network is available, the wireless communication device 102 of some example embodiments can first attempt reselection to LTE before reselecting to GSM.

If, however, it is determined at operation 520 that the realized QoS does satisfy the threshold QoS, the method can instead proceed to operation 540, which can include the wireless communication device 102 suspending IRAT transition to the second RAT 106. Operation 540 can further include suspending IRAT transition to any further RAT having a priority lower than the first RAT 104. In this regard, the wireless communication device 102 can try to keep the serving RAT in an instance in which the QoS is being met by the first RAT 104 so as to avoid traffic interruption from an IRAT procedure that may result in transition to a RAT that may be unable to satisfy the QoS even though its signal strength may be stronger than the serving RAT. In some example embodiments, IRAT transition to a RAT having a higher priority than the first RAT 104 can, however, be allowed, as an increased QoS may result from transition to a higher priority RAT. Thus, for example, assuming an example prioritization of LTE>UMTS>GSM, if the first RAT 104 is UMTS, IRAT transition to LTE can be allowed while IRAT transition to GSM can be suspended.

In some example embodiments, different QoS thresholds can be defined for respective traffic classes. In this regard, different traffic classes can have different respective QoS requirements. It will be appreciated that any of a variety of traffic classifications can be applied to various types of data traffic. By way of non-limiting example, in some example embodiments, data traffic can be classified in accordance with Third Generation Partnership Project (3GPP) traffic classifications. The 3GPP traffic classifications can include conversational, streaming, interactive, and background.

Various respective QoS goals and traffic qualities can be associated with the respective traffic classifications. For example, conversational traffic can be characterized by a conversational pattern having a stringent and low delay and a QoS goal of preserving a time relation (variation) between information entities of the stream. As a further example, streaming traffic can be characterized as a unidirectional continuous stream and a QoS goal of preserving a time relation (variation) between information entities of the stream. As another example, interactive traffic can be characterized by a request-response pattern and a QoS goal of preserving payload content. As still a further example, background traffic can be characterized by a lack of time sensitivity, as a destination may not be expecting the data within a certain time frame, and a QoS goal of preserving payload content. These traffic qualities and QoS goals can be used to define QoS thresholds for the respective traffic classes. For example, in terms of jitter, transfer delay, bit rate, and bit error rate, QoS thresholds for the 3GPP traffic classes can be at least partially defined as set forth in Table 1:

|  | Jitter | Transfer Delay | Bit Rate | Bit Error Rate |
|---|---|---|---|---|
| Conversational | Minimal | Minimal | Granted | Moderate |
| Streaming | Moderate | Moderate | Granted | Moderate |
| Interactive | N/A | Low round-trip delay | N/A | Minimal |
| Background | N/A | N/A | N/A | Minimal |

Figure 6:
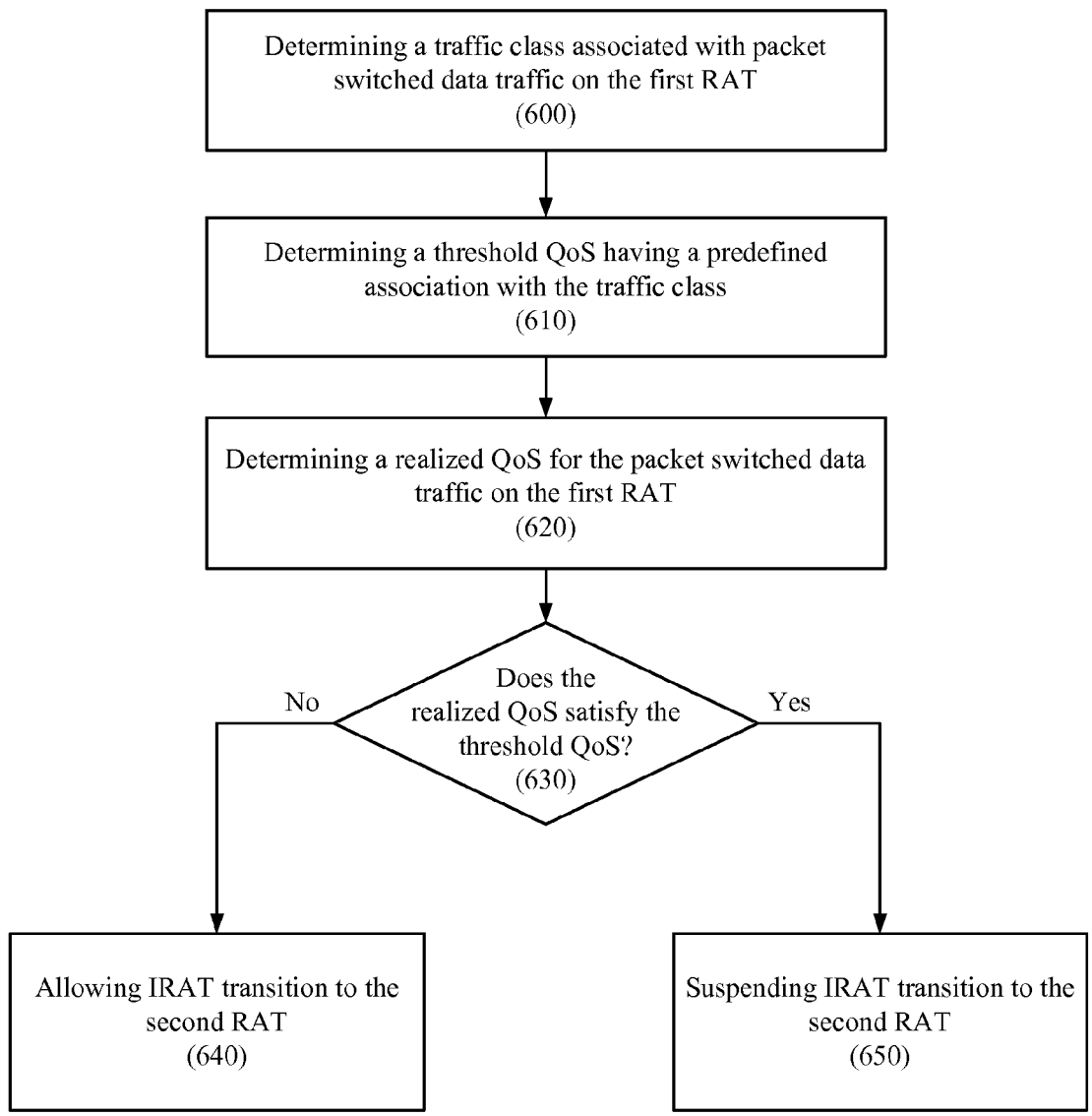
FIG. 6 illustrates a flowchart according to yet another example method for determining whether to allow performance of an IRAT transition according to some example embodiments.

FIG. 6 illustrates a flowchart according to an example method for determining whether to allow performance of an IRAT transition according to some example embodiments in which traffic classification-specific QoS thresholds can be applied. One or more of processing circuitry 210, processor 212, memory 214, transceiver(s) 216, or selection control module 218 can, for example, provide means for performing the operations illustrated in and described with respect to FIG. 6.

Operation 600 can include the wireless communication device 102 determining a traffic class associated with packet switched data traffic on the first RAT 104. In an instance in which data traffic of only a single traffic class is being transmitted and/or received, operation 600 can include determining that single traffic class. However, if data traffic of multiple traffic classes is being transmitted and/or received, operation 600 can include determining multiple traffic classes.

Operation 610 can include the wireless communication device 102 determining a threshold QoS having a predefined association with the determined traffic class(es). In this regard, operation 610 can include determining the applicable threshold QoS, or thresholds, to be applied in order to determine whether a realized QoS satisfies the threshold QoS. In an instance in which data traffic of only a single traffic class is being transmitted and/or received, the threshold QoS having a predefined association with that traffic class can be selected as the applicable threshold QoS. If, however, data traffic of multiple traffic classes is being transmitted and/or received, operation 610 can, for example, include determining the highest threshold QoS of the respective QoS thresholds associated with the multiple traffic classes. As another example, in some example embodiments, each threshold QoS associated with a traffic class determined in operation 600 can be selected in operation 610 as an applicable QoS threshold to be applied to determine whether the threshold QoS is satisfied by the realized QoS.

Operation 620 can include determining a realized QoS for the packet switched data traffic on the first RAT 104. In some instances, operation 620 can include determining multiple realized QoS values. For example, in some embodiments, a realized QoS can be determined for each respective traffic class of data traffic that is being transmitted and/or received.

Operation 630 can include determining whether the realized QoS satisfies the threshold QoS. In embodiments in which a realized QoS is determined for each of multiple traffic classes, operation 630 can include determining for each such traffic class whether the applicable QoS threshold for that traffic class is satisfied. Thus, for example, in instances in which multiple QoS thresholds are selected to be applied in operation 620, operation 630 can include determining whether each of the applied QoS thresholds is satisfied by a corresponding realized QoS.

In an instance in which it is determined at operation 630 that the realized QoS does not satisfy the threshold QoS, the method can proceed to operation 640, which can include the wireless communication device 102 allowing IRAT transition to the second RAT 106. If, however, it is determined at operation 630 that the realized QoS does satisfy the threshold QoS, the method can instead proceed to operation 650, which can include the wireless communication device 102 suspending IRAT transition to the second RAT 106.

As previously discussed, in some example embodiments, determination of a realized QoS, such as in operations 300, 410, 510, and 620, can be at least partially performed at an application layer in accordance with some example embodiments. For example, in some embodiments, the application layer can determine a realized QoS based at least in part on end-to-end communication metrics, such as jitter, transfer delay, bit rate, bit error rate, and/or the like, for a data session. In some example embodiments in which the application layer can determine a realized QoS, the application layer can provide an indication of whether the realized QoS satisfies the threshold QoS to the baseband layer. The baseband layer can use the indication to evaluate whether the realized QoS satisfies the threshold QoS and to determine whether to allow IRAT transition to the second RAT 106 or to suspend IRAT transition to the second RAT 106, such as attendant to performance of operations 310-330, operations 420-440, operations 520-540, and/or operations 630-650.

Figure 7:
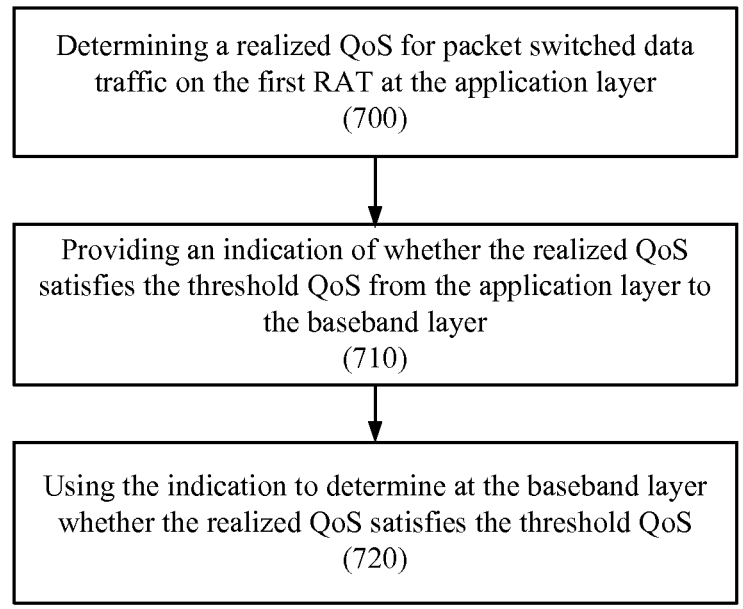
FIG. 7 illustrates a flowchart according to an example method for determining whether a realized QoS satisfies a threshold QoS according to some example embodiments.

FIG. 7 illustrates a flowchart according to an example method for determining whether a realized QoS satisfies a threshold QoS according to some example embodiments in which the realized QoS can be at least partially determined at the baseband layer. One or more of processing circuitry 210, processor 212, memory 214, transceiver(s) 216, or selection control module 218 can, for example, provide means for performing the operations illustrated in and described with respect to FIG. 7.

Operation 700 can include the wireless communication device 102 determining a realized QoS for packet switched data traffic on the first RAT 104 at the application layer. Operation 710 can include the application layer providing an indication of whether the realized QoS satisfies the threshold QoS to the baseband layer. Operation 720 can include the baseband layer using the indication to determine whether the realized QoS satisfies the threshold QoS. In this regard, the baseband layer can accordingly use the indication to determine whether to suspend or allow IRAT transition to the second RAT 106.

In some example embodiments, the baseband layer can be configured to determine realized QoS in addition to or in lieu of the application layer. For example, in some embodiments, if an active application is not capable of collecting QoS parameters and/or providing an indication of whether a realized QoS is acceptable, the baseband layer can be configured to determine a realized QoS. In determining the realized QoS, the baseband layer can be configured to monitor physical layer traffic to determine QoS metrics, such as a transmission queue depth, throughput, and/or other QoS metrics that can be measured or otherwise observed at the baseband layer.

Figure 8:
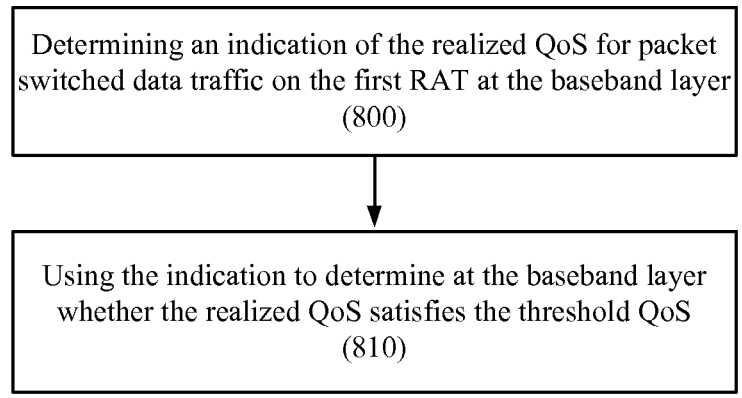
FIG. 8 illustrates a flowchart according to another example method for determining whether a realized QoS satisfies a threshold QoS according to some example embodiments.

FIG. 8 illustrates a flowchart according to another example method for determining whether a realized QoS satisfies a threshold QoS according to some example embodiments in which realized QoS can be at least partially determined at the baseband layer. One or more of processing circuitry 210, processor 212, memory 214, transceiver(s) 216, or selection control module 218 can, for example, provide means for performing the operations illustrated in and described with respect to FIG. 8.

Operation 800 can include the wireless communication device 102 determining an indication of the realized QoS for packet switched data traffic on the first RAT 104 at the baseband layer. For example, in some embodiments, operation

800 can include determining an uplink and/or downlink throughput, which can reflect general uplink/downlink status. Additionally or alternatively, in some example embodiments, operation 800 can include determining a transmission queue depth, which can be reflective of uplink transfer delay.

Operation 810 can include the wireless communication device 102 using the indication to determine at the baseband layer whether the realized QoS satisfies the threshold QoS. For example, operation 810 can include determining whether an uplink and/or downlink throughput satisfies (e.g., exceeds) a threshold throughput. Additionally or alternatively, as another example, operation 810 can include determining whether the transmission queue depth satisfies (e.g., is less than) a threshold depth.

Figure 9:
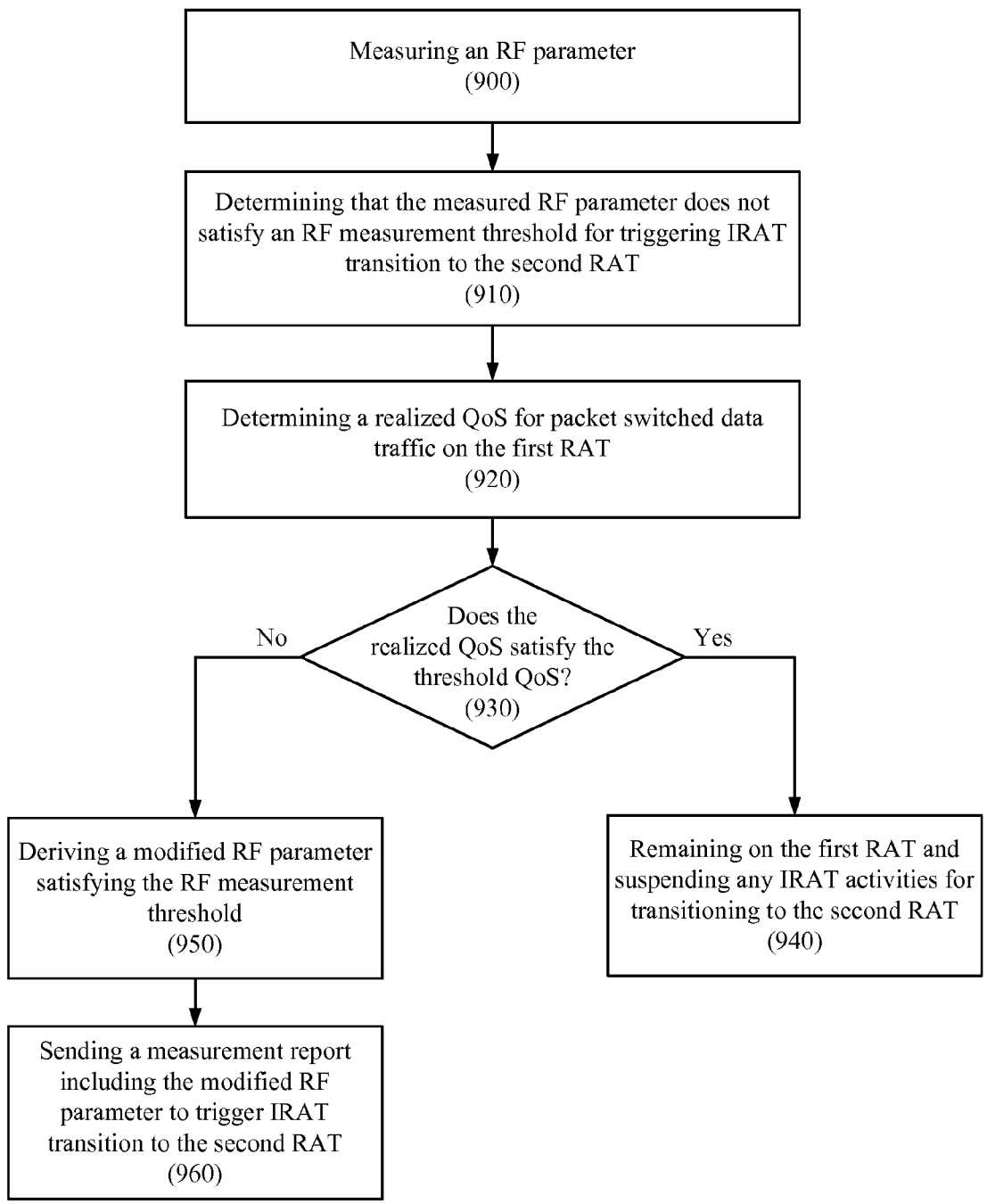
FIG. 9 illustrates a flowchart according to an example method for triggering performance of an IRAT transition according to some example embodiments.

In some example embodiments, a poor realized QoS on a serving RAT, such as the first RAT 104, can be used by the selection control module 218 as a basis to trigger an IRAT transition to a target RAT, such as the second RAT 106, even if an RF measurement threshold for triggering IRAT transition has not been met. FIG. 9 illustrates a flowchart according to a method that can be performed by a wireless communication device 102 in accordance with some such example embodiments in which poor QoS can be used as a basis for triggering an IRAT transition even if an RF measurement threshold for triggering IRAT transition has not been met. One or more of processing circuitry 210, processor 212, memory 214, transceiver(s) 216, or selection control module 218 can, for example, provide means for performing the operations illustrated in and described with respect to FIG. 9.

Operation 900 can include the wireless communication device 102 measuring an RF parameter. By way of non-limiting example, operation 900 can include measuring an RSRQ, RSRP, RSSI, RSCP, and/or the like of one or more of the first RAT 104 or second RAT 106. Operation 910 can include the wireless communication device 102 determining that the measured RF parameter does not satisfy an RF measurement threshold for triggering IRAT transition to the second RAT 106.

Operation 920 can include the wireless communication device 102 determining a realized QoS for packet switched data traffic on the first RAT 104. Operation 930 can include the wireless communication device 102 determining whether the realized QoS satisfies the threshold QoS.

In an instance in which it is determined at operation 930 that the realized QoS does satisfy the threshold QoS, the method can proceed to operation 940, which can include the wireless communication device 102 remaining on the first RAT 104. If, however, it is determined at operation 930 that the realized QoS does not satisfy the threshold QoS, the method can instead proceed to operation 950, which can include the wireless communication device 102 deriving a modified RF parameter satisfying the RF measurement threshold. By way of non-limiting example, operation 950 can include applying an offset to the RF parameter measured in operation 900. Operation 960 can include the wireless communication device 102 sending a measurement report including the modified RF parameter to trigger IRAT transition to the second RAT 106. In this regard, operation 960 can, for example, include sending the measurement report to a serving base station on the first RAT 104.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for determining whether to allow performance of an inter-radio access technology (IRAT) transition, the method comprising a wireless communication device:

measuring a radio frequency (RF) parameter for triggering the IRAT transition from a first radio access technology (RAT) to a second RAT;

determining whether the measured RF parameter falls below an RF measurement threshold for triggering the IRAT transition from the first RAT to the second RAT;

determining a realized quality of service (QoS) for packet switched data traffic on the first RAT;

determining whether the realized QoS satisfies a threshold QoS;

suspending the IRAT transition from the first RAT to the second RAT in an instance in which it is determined that the realized QoS satisfies the threshold QoS and the measured RF parameter falls below the RF measurement threshold for triggering the IRAT transition; and allowing the IRAT transition from the first RAT to the second RAT in an instance in which it is determined that the realized QoS does not satisfy the threshold QoS and the measured RF parameter equals or exceeds the RF measurement threshold for triggering the IRAT transition.

2. The method of claim 1, wherein suspending the IRAT transition from the first RAT to the second RAT comprises suspending IRAT measurement reporting for triggering the IRAT transition from the first RAT to the second RAT.

3. The method of claim 1, wherein suspending the IRAT transition from the first RAT to the second RAT comprises suspending IRAT transition activities initiated in response to the measured RF parameter falling below the radio frequency (RF) measurement threshold for triggering the IRAT transition.

4. The method of claim 1, further comprising the wireless communication device:

prioritizing a plurality of RATs, the plurality of RATs comprising the first RAT and the second RAT, the first RAT being assigned a higher priority than the second RAT; and wherein suspending the IRAT transition from the first RAT to the second RAT comprises suspending IRAT transition to any RAT assigned a lower priority than the first RAT, while allowing IRAT transition to a RAT assigned a higher priority than the first RAT.

5. The method of claim 1, further comprising the wireless communication device:
in an instance in which it is determined that the realized QoS does not satisfy the threshold QoS and the measured RF parameter equals or exceeds the RF measurement threshold for triggering the IRAT transition:
deriving a modified RF parameter by applying an offset to the measured RF parameter, the modified RF parameter falling below the RF measurement threshold for triggering the IRAT transition from the first RAT to the second RAT; and
sending a measurement report including the modified RF parameter to trigger the IRAT transition from the first RAT to the second RAT.

6. The method of claim 1, wherein:
determining the realized QoS for packet switched data traffic on the first RAT comprises measuring the realized QoS at an application layer; and
determining whether the realized QoS satisfies the threshold QoS comprises the application layer determining whether the realized QoS satisfies the threshold QoS; and wherein the method further comprises:
the application layer providing an indication of whether the realized QoS satisfies the threshold QoS to a baseband layer; and
the baseband layer using the indication to determine whether to suspend or allow the IRAT transition from the first RAT to the second RAT.

7. The method of claim 1, wherein determining the realized QoS for packet switched data traffic on the first RAT comprises determining an indication of the realized QoS at a baseband layer.

8. The method of claim 7, wherein determining the indication of the realized QoS comprises the baseband layer determining one or more of a depth of a transmission queue or a realized throughput.

9. The method of claim 1, wherein determining the realized QoS comprises determining one or more of a realized jitter, a realized transfer delay, a realized bit rate, or a realized bit error rate.

10. The method of claim 1, further comprising the wireless communication device:
determining a traffic class associated with the packet switched data traffic; and
wherein determining whether the realized QoS satisfies the threshold QoS comprises determining whether the realized QoS satisfies a threshold QoS having a predefined association with the traffic class.

11. A wireless communication device comprising:
at least one transceiver, the at least one transceiver configured to transmit data and receive data using a first radio access technology (RAT) and a second RAT; and
processing circuitry coupled to the at least transceiver, the processing circuitry configured to control the wireless communication device to at least:
measure a radio frequency (RF) parameter for triggering an inter-radio access technology (IRAT) transition from the first RAT to the second RAT;
determine whether the measured RF parameter falls below an RF measurement threshold for triggering the IRAT transition from the first RAT to the second RAT;
determine a realized quality of service (QoS) for packet switched data traffic on the first RAT;
determine whether the realized QoS satisfies a threshold QoS;
suspend the IRAT transition from the first RAT to the second RAT in an instance in which it is determined that the realized QoS satisfies the threshold QoS and the measured RF parameter falls below the RF measurement threshold for triggering the IRAT transition; and
allow the IRAT transition from the first RAT to the second RAT in an instance in which it is determined that the realized QoS does not satisfy the threshold QoS and the measured RF parameter equals or exceeds the RF measurement threshold for triggering the IRAT transition.

12. The wireless communication device of claim 11, wherein the processing circuitry is configured to control the wireless communication device to suspend the IRAT transition from the first RAT to the second RAT at least in part by controlling the wireless communication device to suspend IRAT measurement reporting for triggering the IRAT transition from the first RAT to the second RAT.

13. The wireless communication device of claim 11, wherein the processing circuitry is configured to control the wireless communication device to suspend the IRAT transition from the first RAT to the second RAT at least in part by controlling the wireless communication device to suspend IRAT transition activities initiated in response to the measured RF parameter falling below the radio frequency (RF) measurement threshold for triggering the IRAT transition.

14. The wireless communication device of claim 11, wherein the processing circuitry is further configured to control the wireless communication device to:
prioritize a plurality of RATs, the plurality of RATs comprising the first RAT and the second RAT, the first RAT being assigned a higher priority than the second RAT; and
suspend the IRAT transition from the first RAT to any RAT assigned a lower priority than the first RAT, while allowing IRAT transition to a RAT assigned a higher priority than the first RAT.

15. The wireless communication device of claim 11, wherein the processing circuitry is further configured to control the wireless communication device to:
in an instance in which it is determined that the realized QoS does not satisfy the threshold QoS and the measured RF parameter equals or exceeds the RF measurement threshold for triggering the IRAT transition:
derive a modified RF parameter by applying an offset to the measured RF parameter, the modified RF parameter falling below the RF measurement threshold for triggering the IRAT transition from the first RAT to the second RAT; and
send a measurement report including the modified RF parameter to trigger the IRAT transition from the first RAT to the second RAT.

16. The wireless communication device of claim 15, wherein the processing circuitry is further configured to control the wireless communication device to:
determine the realized QoS for packet switched data traffic on the first RAT at least in part by controlling an application layer to measure the realized QoS;
determine whether the realized QoS satisfies a threshold QoS at least in part by controlling the application layer to determine whether the realized QoS satisfies the threshold QoS;
control the application layer to provide an indication of whether the realized QoS satisfies the threshold QoS to a baseband layer; and control the baseband layer to use the indication to determine whether to suspend or allow the IRAT transition from the first RAT to the second RAT.

17. The wireless communication device of claim 11, wherein the processing circuitry is configured to control the wireless communication device to determine the realized QoS for packet switched data traffic on the first RAT at least in part by controlling a baseband layer of the wireless communication device to determine an indication of the realized QoS.

18. The wireless communication device of claim 17, wherein the processing circuitry is configured to control the baseband layer to determine the indication of the realized QoS at least in part by controlling the baseband layer to determine one or more of a depth of a transmission queue or a realized throughput.

19. The wireless communication device of claim 11, wherein the processing circuitry is configured to control the wireless communication device to determine the realized QoS at least in part by controlling the wireless communication device to determine one or more of a realized jitter, a realized transfer delay, a realized bit rate, or a realized bit error rate.

20. The wireless communication device of claim 11, wherein the processing circuitry is further configured to control the wireless communication device to:
determine a traffic class associated with the packet switched data traffic; and
determine whether the realized QoS satisfies the threshold QoS at least in part by determining whether the realized QoS satisfies a threshold QoS having a predefined association with the traffic class.

21. A computer program product for determining whether to allow performance of an inter-radio access technology (IRAT) transition, the computer program product comprising at least one non-transitory computer readable storage medium having computer program code stored thereon, the computer program code comprising:
program code for measuring a radio frequency (RF) parameter for triggering the IRAT transition from a first radio access technology (RAT) to a second RAT;
program code for determining whether the measured RF parameter falls below an RF measurement threshold for triggering the IRAT transition from the first RAT to the second RAT;
program code for determining a realized quality of service (QoS) for packet switched data traffic on the first RAT;
program code for determining whether the realized QoS satisfies a threshold QoS;
program code for suspending the IRAT transition from the first RAT to the second RAT in an instance in which it is determined that the realized QoS satisfies the threshold QoS and the measured RF parameter falls below the RF measurement threshold for triggering the IRAT transition; and
program code for allowing the IRAT transition from the first RAT to the second RAT in an instance in which it is determined that the realized QoS does not satisfy the threshold QoS and the measured RF parameter equals or exceeds the RF measurement threshold for triggering the IRAT transition.

22. The computer program product of claim 21, wherein the program code for suspending the IRAT transition from the first RAT to the second RAT comprises program code for suspending IRAT measurement reporting for triggering the IRAT transition from the first RAT to the second RAT.

23. The computer program product of claim 21, wherein the program code for suspending the IRAT transition from the first RAT to the second RAT comprises program code for suspending IRAT transition activities initiated in response to the measured RF parameter falling below the radio frequency (RF) measurement threshold for triggering the IRAT transition.

24. The computer program product of claim 21, further comprising:
program code for prioritizing a plurality of RATs, the plurality of RATs comprising the first RAT and the second RAT, the first RAT being assigned a higher priority than the second RAT; and
program code for suspending IRAT transition to any RAT assigned a lower priority than the first RAT, while allowing IRAT transition to a RAT assigned a higher priority than the first RAT.

25. The computer program product of claim 21, further comprising:
program code for determining a traffic class associated with the packet switched data traffic; and
wherein the program code for determining whether the realized QoS satisfies the threshold QoS comprises program code for determining whether the realized QoS satisfies a threshold QoS having a predefined association with the traffic class.

* * * * *